US007431265B2

(12) United States Patent
Yueh

(10) Patent No.: US 7,431,265 B2
(45) Date of Patent: Oct. 7, 2008

(54) SWIVELING HANDLE MOUNTING MECHANISM OF A HYDRAULIC GARAGE JACK

(75) Inventor: Ming Chuan Yueh, Chia-I Hsien (TW)

(73) Assignee: Shinn Fu Corporation, Taipei (TW)

( * ) Notice: Subject to any disclaimer, the term of this patent is extended or adjusted under 35 U.S.C. 154(b) by 0 days.

(21) Appl. No.: 11/635,667

(22) Filed: Dec. 8, 2006

(65) Prior Publication Data

US 2008/0134465 A1 Jun. 12, 2008

(51) Int. Cl.
*B60P 1/48* (2006.01)

(52) U.S. Cl. ......................... 254/8 B; 254/2 B; 254/8 R

(58) Field of Classification Search ................. 254/8 B, 254/2 B, DIG. 1, DIG. 3, 124, 131, 8 R
See application file for complete search history.

(56) References Cited

U.S. PATENT DOCUMENTS 4,277,048 A * 7/1981 Okuda ........................ 254/8 B
4,653,902 A * 3/1987 Hester ......................... 355/32
4,850,568 A * 7/1989 Hung ......................... 254/8 B
5,431,369 A * 7/1995 Hung ......................... 254/8 B
5,551,668 A * 9/1996 Hung ......................... 254/8 B
6,086,047 A * 7/2000 Lee ............................ 254/8 B
6,505,816 B1 * 1/2003 Hung ......................... 254/8 B

* cited by examiner

*Primary Examiner*—Lee D Wilson
(74) *Attorney, Agent, or Firm*—Bacon & Thomas, PLLC

(57) ABSTRACT

A swiveling handle mounting mechanism mounted on the pump of the hydraulic unit of a hydraulic garage jack is disclosed to include a seat affixed with a pressure plate to the pump beyond the oil return valve of the hydraulic unit, a swiveling holder horizontally rotatably coupled to the seat beneath the pressure plate, a handle sleeve vertically pivotally connected to the swiveling holder and holding an operating handle for driving the pump to pump out the hydraulic fluid for lifting the load, a locking mechanism installed in the swiveling holder at one side for locking the handle sleeve to the swiveling holder, and a pedal pivoted to the swiveling holder for operation by the user to open a release valve for allowing return of the hydraulic fluid.

9 Claims, 13 Drawing Sheets

SWIVELING HANDLE MOUNTING MECHANISM OF A HYDRAULIC GARAGE JACK

BACKGROUND OF THE INVENTION (a) Field of the Invention

The present invention relates to a hydraulic garage jack and more particularly, to a swiveling handle mounting mechanism of a hydraulic garage jack, which has the swiveling handle sleeve and the release valve separately installed.

(b) Description of the Prior Art

A conventional hydraulic garage jack has a fixed handle sleeve to hold an operating handle. When the user pumps the operating handle up and down, the hydraulic fluid is pumped out of the fluid chamber to the working fluid cylinder to lift the lifting arm which fits the load accordingly. Because the handle sleeve is fixedly fastened to the frame structure of the hydraulic garage jack, the operating direction of the operating handle is not adjustable.

U.S. Pat. No. 6,086,047 discloses a hydraulic jack, which has a bearing provided under the hydraulic cylinder, such that the handle may be rotated to any direction as required. According to this design, the hydraulic cylinder and the pump are arranged in the member that supports the handle, therefore the lifting stroke is short. Further, the hydraulic jack may fall sideways to the ground easily due to a short wheel base of the rear wheels.

U.S. Pat. No. 6,505,816, issued to the present inventor, discloses a jack with a swiveling handle sleeve. The handle sleeve is locked to a swiveling supporting seat. The swiveling supporting seat passes through the pump and washers to be locked to the base of the jack. Thereby, the handle sleeve may swivel rightwards and leftwards. The release valve is connected to a flexible shaft for controlling the opening and closing of the release valve. A steel ball bearing or a thrust bearing can be installed between the swiveling supporting seat or the base of the jack so that the handle sleeve may swivel freely. The handle sleeve and the swiveling supporting seat have a design for confining the lower limit. However, this design of jack is still not satisfactory in function because the handle sleeve may interfere with the release valve during swiveling.

SUMMARY OF THE INVENTION

The present invention has been accomplished under the circumstances in view. According to one aspect of the present invention, the swiveling handle mounting mechanism is mounted on the pump of the hydraulic unit of a hydraulic garage jack, comprising a seat affixed with a pressure plate to the pump beyond the release valve of the hydraulic unit, a swiveling holder horizontally rotatably coupled to the seat beneath the pressure plate, and a handle sleeve vertically pivotally connected to the swiveling holder to hold a handle for driving the pump to pump out the hydraulic fluid for lifting the load. Thus, the handle sleeve can be swiveled horizontally through 360° to move the operating handle to the desired operating direction. Further, changing the direction of the operating handle does not move the release valve accidentally, and therefore the hydraulic garage jack is safe in use.

According to another aspect of the present invention, a locking mechanism is installed in the swiveling holder at one side for locking the handle sleeve to the swiveling holder. The locking mechanism comprises a ratchet fixedly arranged around the periphery of the pressure plate, a pinhole on one upright sidewall of the swiveling holder, a lock pin inserted through the pinhole on the associating sidewall of the swiveling holder and movable relative to the swiveling holder between a locking position where the lock pin engages the ratchet to lock the handle sleeve to the swiveling holder and an unlocking position where the lock pin is disengaged from the ratchet for allowing movement of the handle sleeve relative to the swiveling holder, a spring member mounted on the lock pin and stopped between a part of the swiveling holder and one end of the lock pin to hold the lock pin in the unlocking position, and an actuating member pivoted to the upright sidewall of the swiveling holder holding the lock pin for moving the lock pin between the locking position and the unlocking position. Further, the actuating member has a finger rod extended from one end thereof for operation by hand.

According to still another aspect of the present invention, the swiveling handle mounting mechanism further comprises a pedal assembly pivoted to the swiveling holder for operation by the user to open the release valve for allowing return of the hydraulic fluid.

According to still another aspect of the present invention, the pedal assembly comprises a U-lug affixed to the hydraulic unit with a screw bolt at one side of the valve chamber, a pedal pivotally connected to the U-lug with a pivot, and a tensile spring connected between the pedal and one upright sidewall of the swiveling holder.

According to still another aspect of the present invention, a safety block is fixedly provided at one upright sidewall of the swiveling holder for supporting the pedal and stopping the pedal from operation. Therefore, the release valve is normally kept in the closed state. When the pedal is released after each operation, the tensile spring returns the pedal to its former position where the pedal is stopped above the safety block.

According to still another aspect of the present invention, the release valve is mounted with a copper washer in the valve chamber, and comprised of a release valve connecting bar, an oil return guide chamber, a first steel ball, a second steel ball, a steel ball stopper, a barrel-like compression spring, a conical compression spring, and an adjustment screw. The return oil guide chamber has a small return oil hole. When the hydraulic garage jack is bearing a load, the return flow of the hydraulic fluid goes through the small return oil hole of the oil return guide chamber so that the lifting arm is lowered slowly, ensuring high safety. When the hydraulic garage jack bears no pressure, the return flow of the hydraulic fluid goes through a big return oil hole for allowing quick return of the lifting arm.

DETAILED DESCRIPTION OF THE PREFERRED EMBODIMENTS

Figure 1:
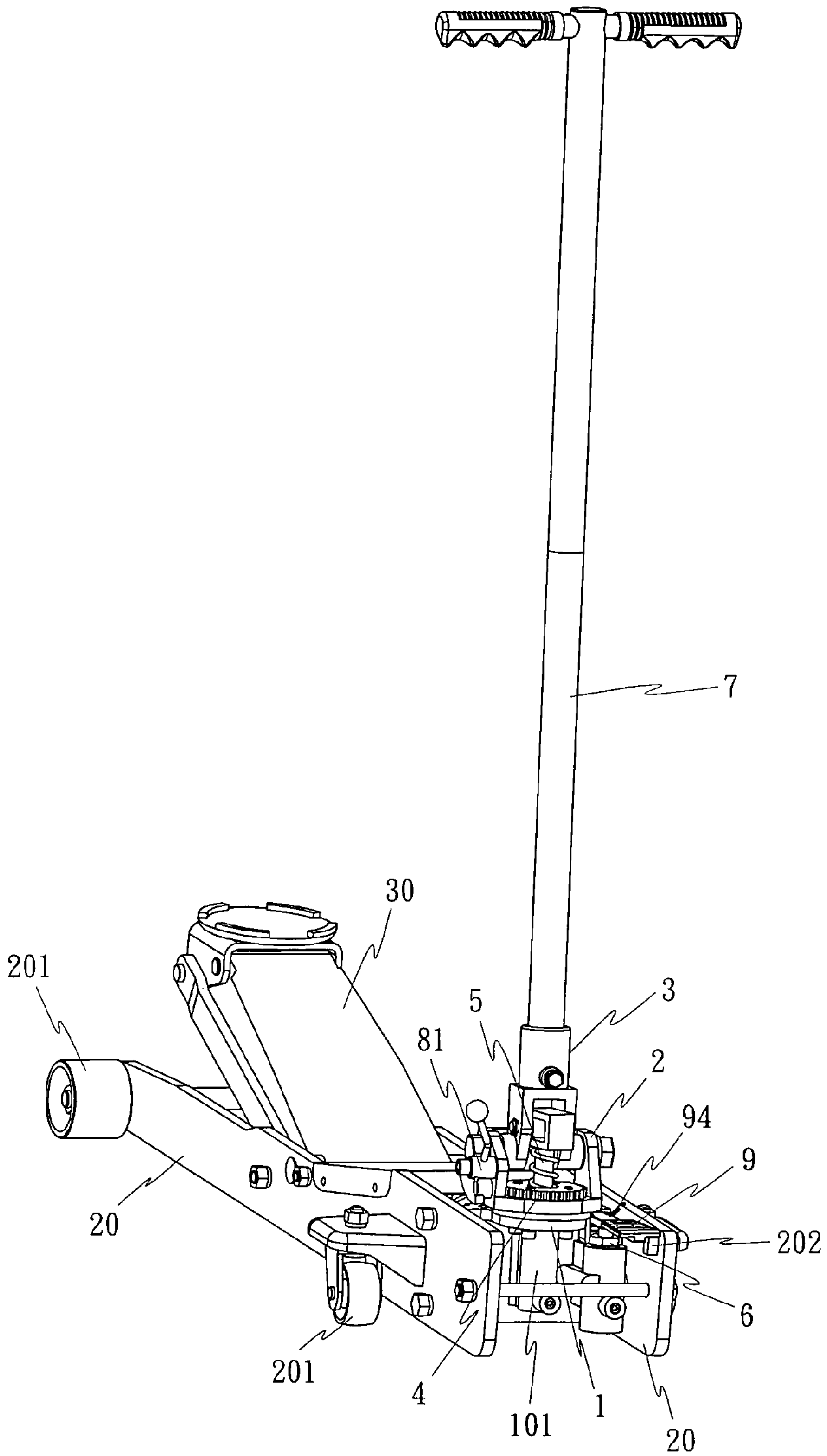
FIG. 1 is an elevational view of a hydraulic garage jack according to the present invention.
Figure 2:
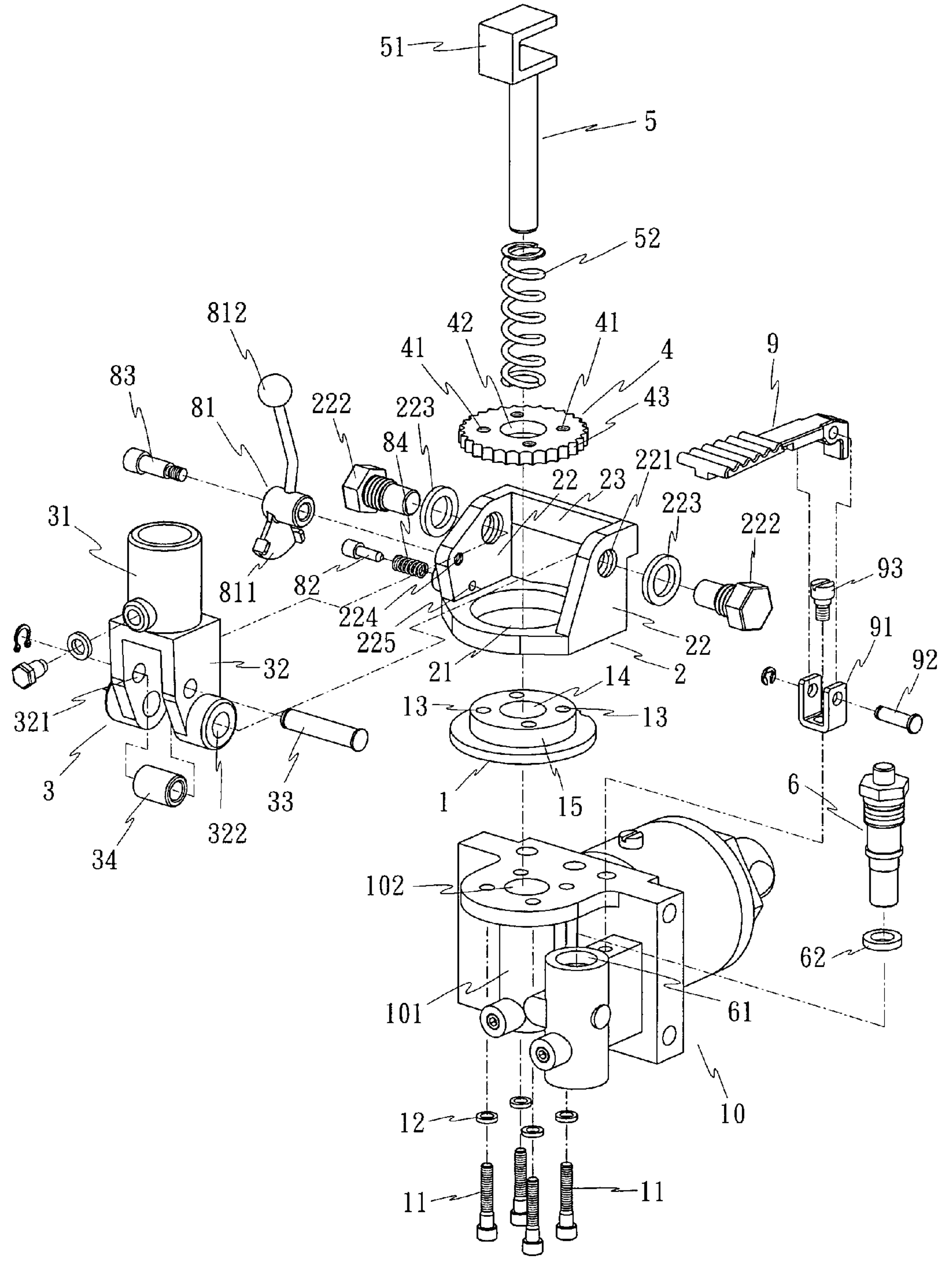
FIG. 2 is an exploded view of the major part of the hydraulic garage jack according to the present invention.

Referring to FIGS. 1 and. 2, a swiveling handle mounting mechanism is shown mounted on the pump 101 of the hydraulic unit 10 of a hydraulic garage jack, and comprised of a seat 1, a swiveling holder 2, a handle sleeve 3, a pressure plate 4, and a plunger 5. The hydraulic unit 10 is set between two side panels 20 of the hydraulic garage jack, having a lifting arm 30 at the other end. The side panels 20 are respectively equipped with a wheel 201. Further, the hydraulic unit 10 has an release valve 6 installed therein and separated from the handle sleeve 3.

The seat 1 is a short, stepped cylindrical member having a center hole 14 disposed in fluid communication with the fluid chamber 102 of the pump 101 and a plurality of mounting through holes 13 fastened to the top wall of the pump 101 of the hydraulic unit 10 with screw bolts 11 and spring washers 12.

The swiveling holder 2 is a hollow frame having two upright sidewalls 22, a connecting wall 23 transversely connected between the two upright sidewalls 22 at one side, a vertically extending circular bottom hole 21 coupled to the upper small diameter part 15 of the short, stepped cylindrical seat 1, and two screw holes 221 respectively transversely formed on the two opposite upright sidewalls 22.

Figure 3:
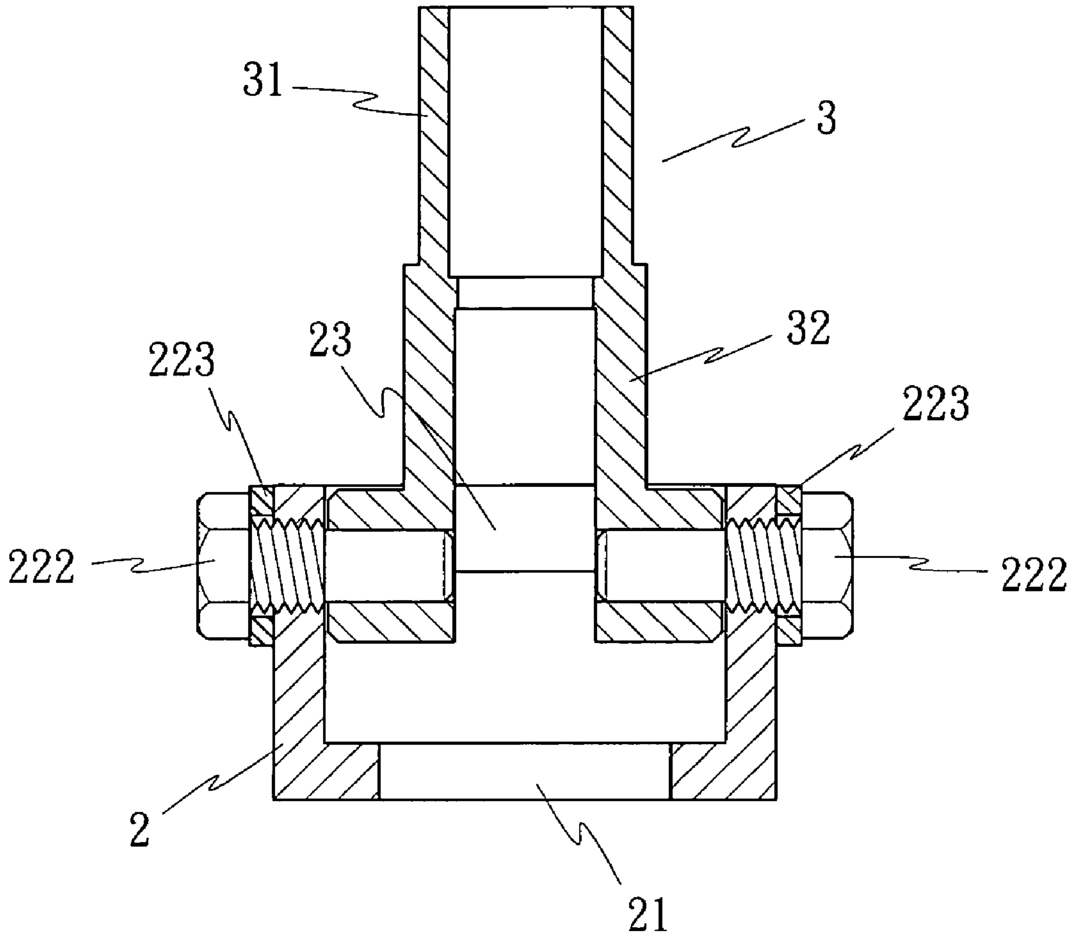
FIG. 3 is a sectional view of a part of the present invention, showing the arrangement of the swiveling holder and the handle sleeve.

The handle sleeve 3 has a top barrel 31, which receives an operating handle 7, and a downwardly extending bottom U-lug 3 inserted in between the two upright sidewalls 22 of the swiveling holder 2. The bottom U-lug 32 has two pivot holes 322 and two pinholes 321 arranged at two different elevations. Two screw bolts 222 mounted with a respective washer 223 and respectively inserted through the pivot holes 322 of the U-lug 32 and respectively threaded into the screw holes 221 of the swiveling holder 2 to pivotally secure the handle sleeve 3 to the swiveling holder 2 (see FIG. 3). A pin 33 is fastened to the pinholes 321 to support a roller 34 in the transversely extending top U-lug 51 of the plunger 5.

The pressure plate 4 is a flat annular member fitting the upper small diameter part 15 of the short, stepped cylindrical seat 1, having a plurality of vertical screw holes 41 respectively fastened to the mounting through holes 13 of the seat 1 and the top wall of the pump 101 of the hydraulic unit 10 by the aforesaid screw bolts 11 and spring washers 12, and a center hole 42 aimed at the center hole 14 of the seat 1 for the insertion of the plunger 5 and a return spring 52.

Figure 4:
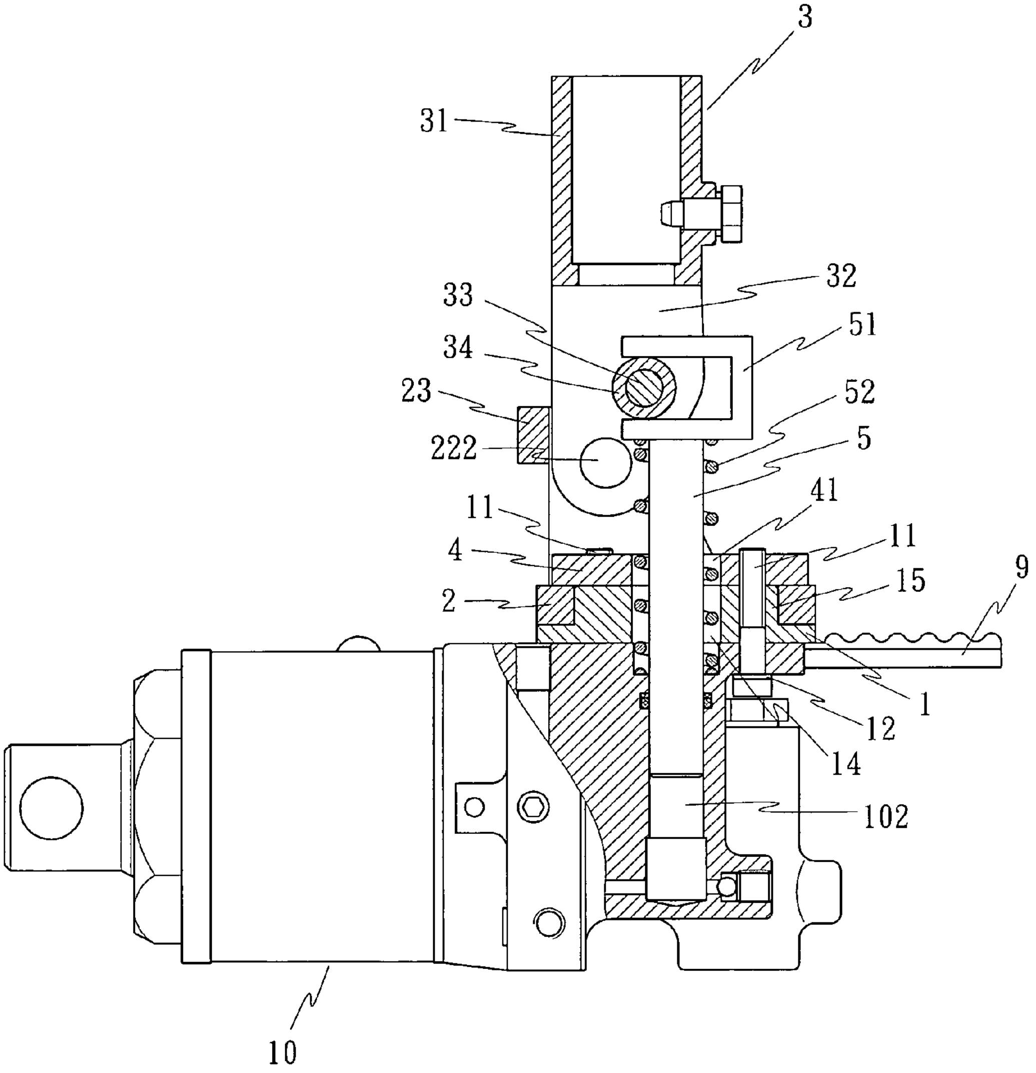
FIG. 4 is a schematic sectional side view of the major part of the hydraulic garage jack according to the present invention.
Figure 5:
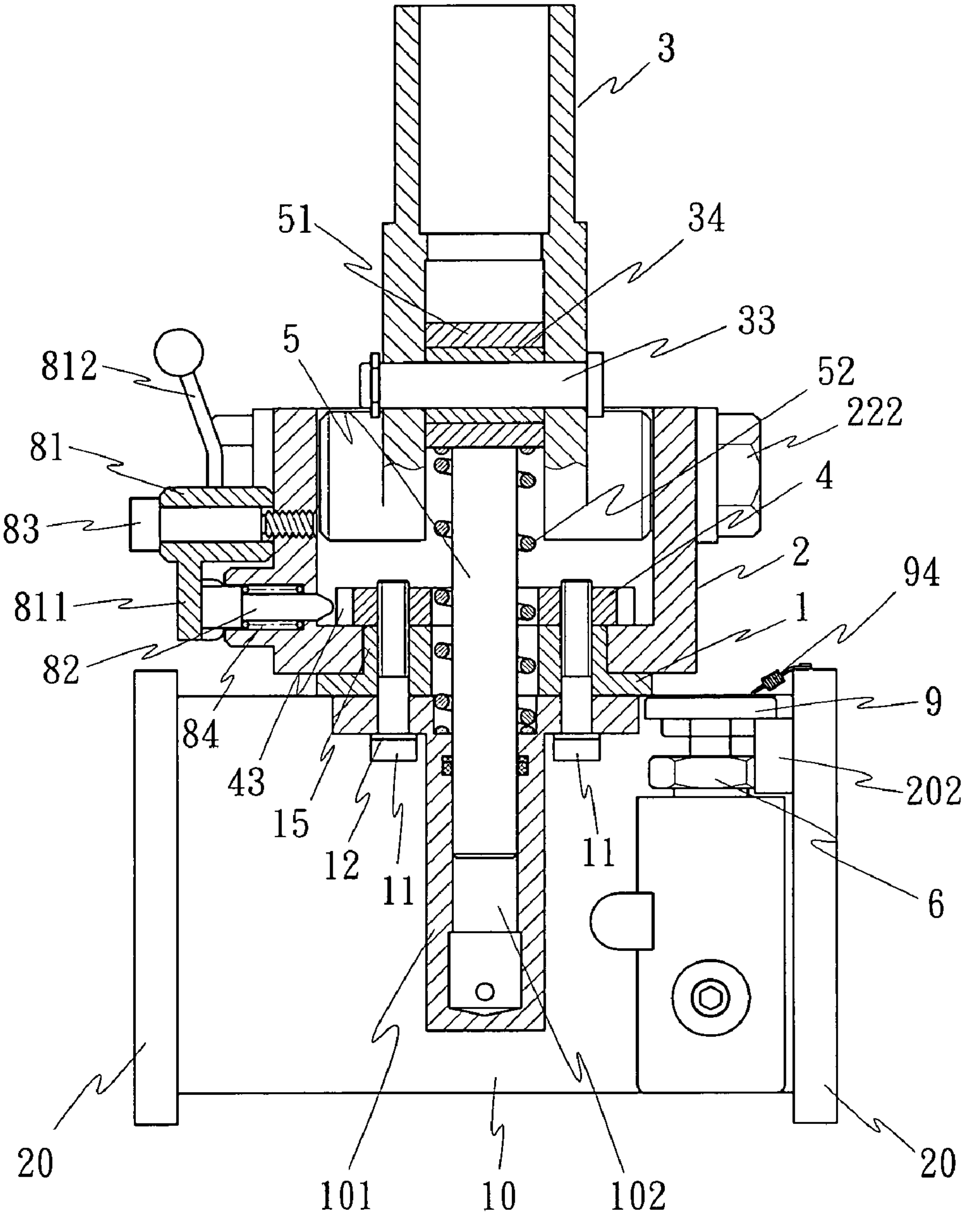
FIG. 5 is a schematic sectional end view of the major part of the hydraulic garage jack according to the present invention.

The plunger 5 is inserted through the return spring 52 into the fluid chamber 102 of the pump 101 and peripherally sealed (see FIGS. 4 and 5). When oscillating the operating handle 7, the plunger 5 is reciprocated, thereby causing the pump 101 to pump the hydraulic fluid out of the fluid chamber 102 into the cylinder (not shown) to lift the lifting arm 30.

Based on the aforesaid arrangement, the handle sleeve 3 is pivoted to the swiveling holder 2, which is mounted in between the seat 1 and the pressure plate 4 and rotatable relative to the seat 1. Therefore, the operating handle 7 is turnable with the handle sleeve 3 relative to the seat 1 through 360 degrees. Further, because the handle sleeve 3 and the release valve 6 are separately installed, the operation of the handle sleeve 3 does not interfere with the operation of the release valve 6, providing for enhanced safety during operation.

Figure 6:
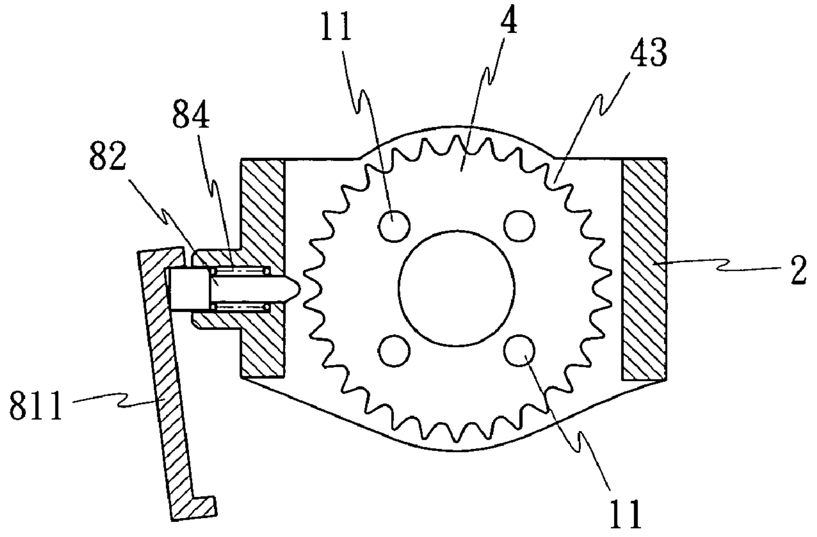
FIG. 6 is a schematic sectional of a part of the present invention, showing the locking mechanism arranged in the swiveling holder.
Figure 7:
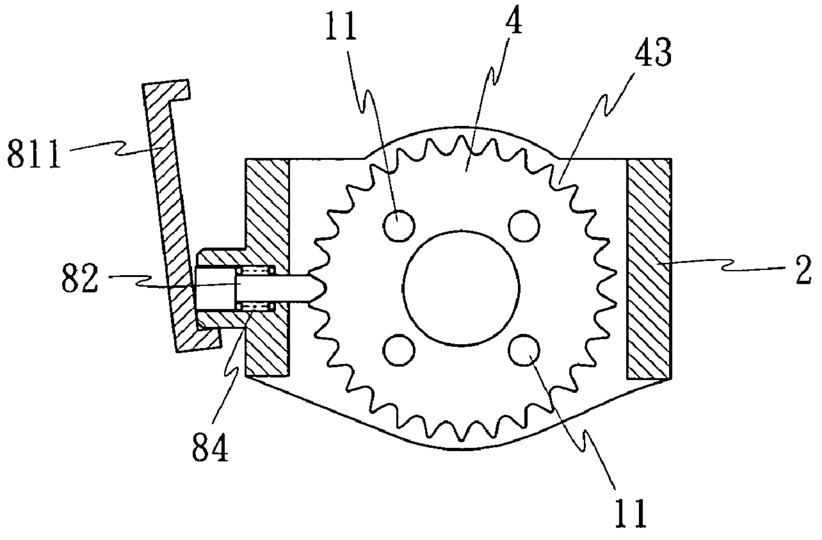
FIGS. 7~9 are schematic sectional views showing different locking positions of the locking mechanism according to the present invention.
Figure 8:
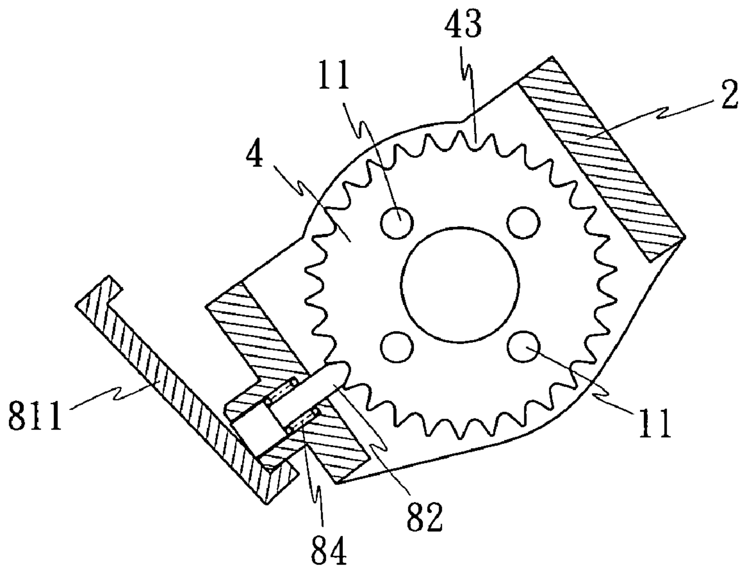
Figure 9:
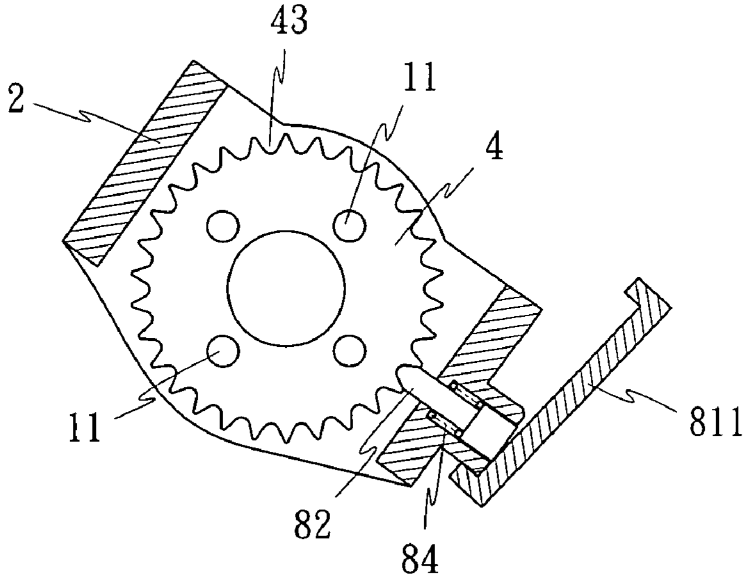
Figure 10:
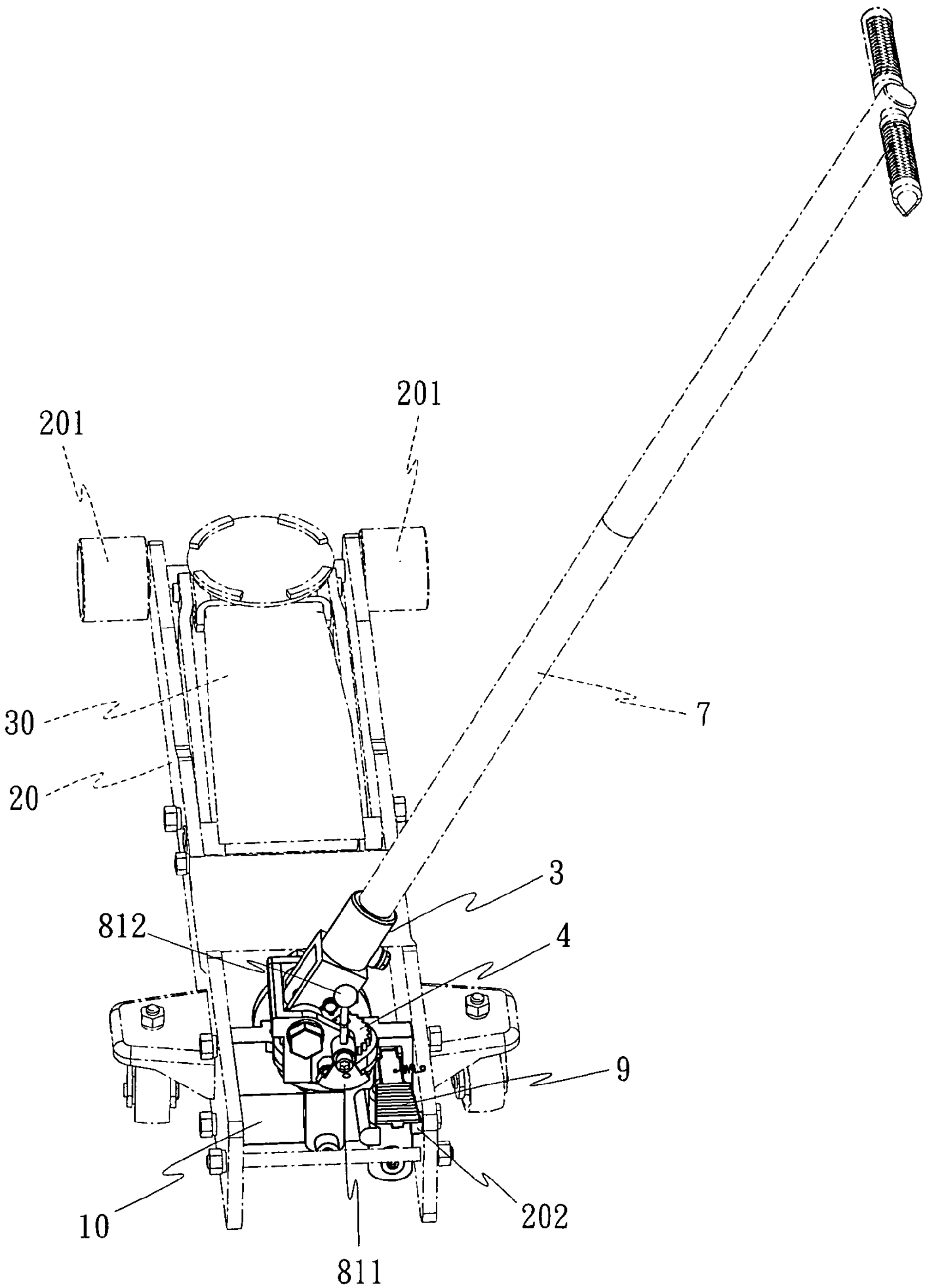
FIG. 10 is a schematic drawing of the present invention, showing the handle sleeve of the hydraulic garage jack swiveled to the right side.
Figure 11:
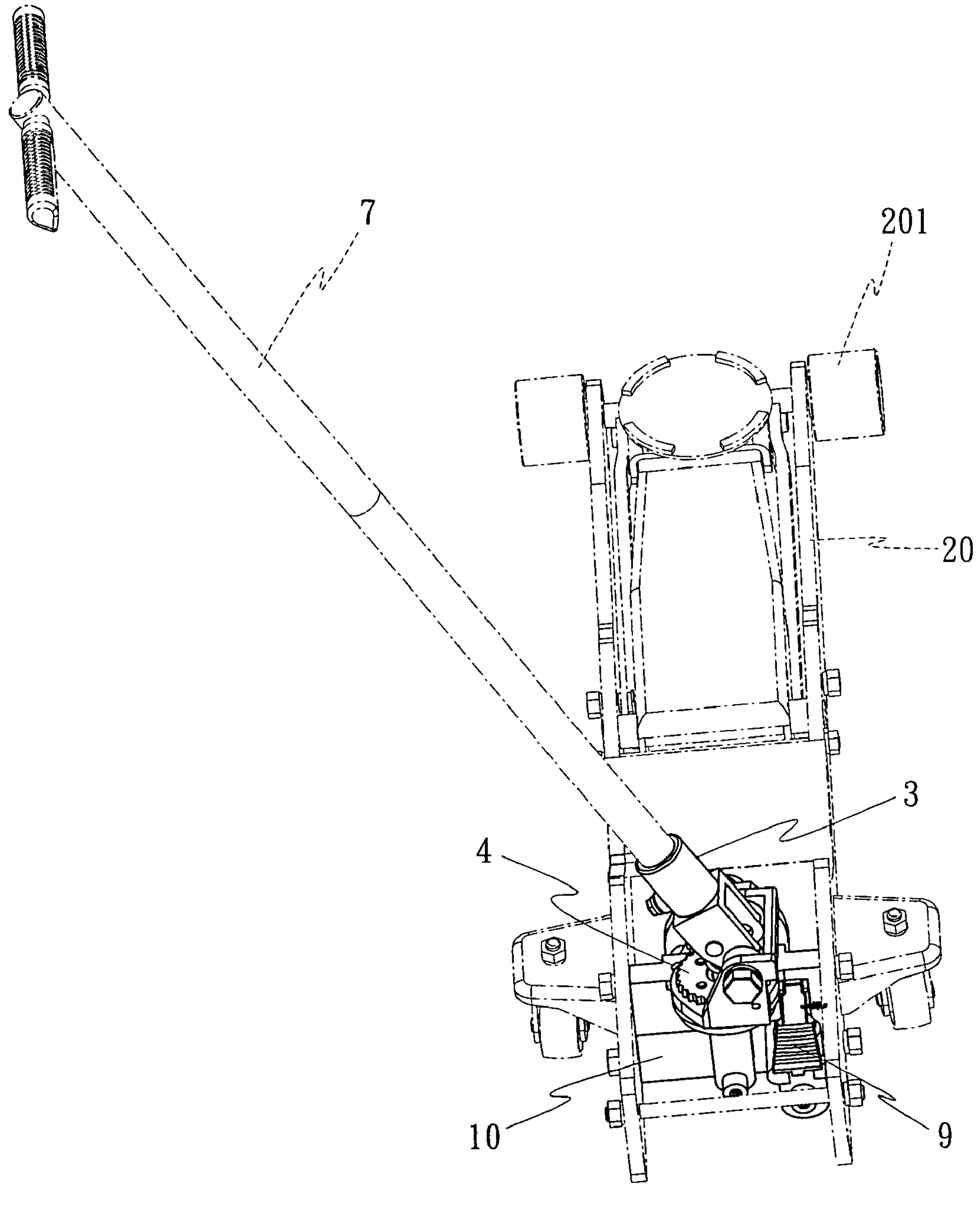
FIG. 11 is a schematic drawing of the present invention, showing the handle sleeve of the hydraulic garage jack swiveled to the left side.
Figure 12:
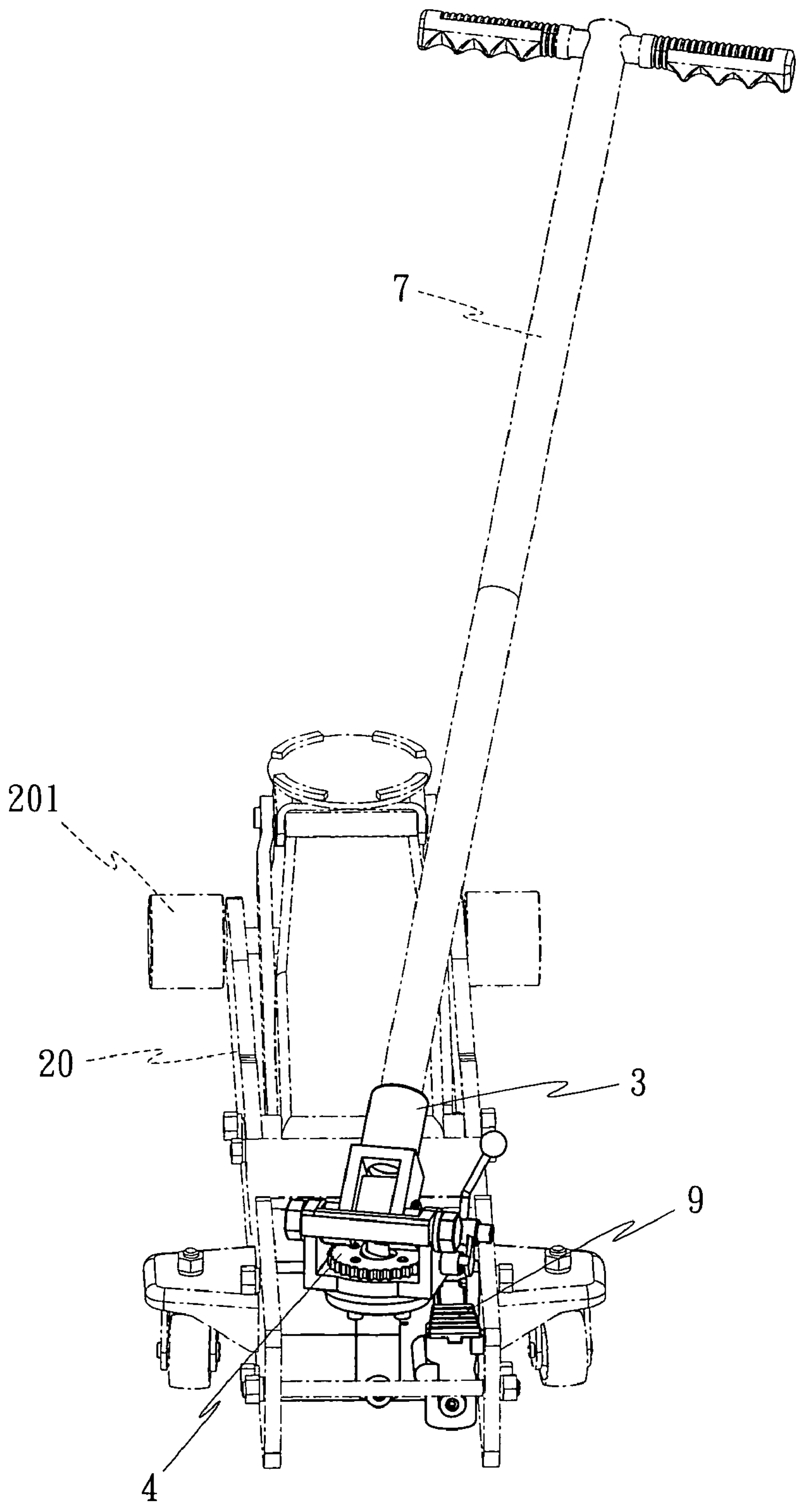
FIG. 12 is a schematic drawing of the present invention, showing the handle sleeve of the hydraulic garage jack swiveled to the rear side.

Further, the hydraulic garage jack may be provided with a locking mechanism to lock the handle sleeve 3 in the desired angular position. According to the present preferred embodiment, the locking mechanism comprises an actuating member 81 and a lock pin 82. The pressure plate 4 has a ratchet 43 extending around the periphery. The swiveling holder 2 has a screw hole 224 and a pinhole 225 on one upright sidewall 22. A screw bolt 83 is inserted through the actuating member 81 and threaded into the screw hole 224 to pivotally secure the actuating member 81 to the swiveling holder 2. The lock pin 82 is inserted through a spring member 84 and the pinhole 225 of the swiveling holder 2 for engaging the ratchet 43. The actuating member 81 has an oblique wall 811 disposed at one end and stopped against the lock pin 82 (see FIG. 6), and a finger rod 812 disposed at the other end. By means of the finger rod 812, the user can swivel the actuating member 81 relative to the swiveling holder 2 to move the lock pin 82 forwards or backwards. When the lock pin 82 is moved forwards, it is forced into engagement with the ratchet 43 of the pressure plate 4 (see FIGS. 7~9 or FIGS. 10~12), thereby locking the handle sleeve 3). When the lock pin 82 is moved backwards, it is disengaged from the ratchet 43 of the pressure plate 4, and therefore the handle sleeve 3 is unlocked and movable relative to the swiveling holder 2. Therefore, by means of the aforesaid locking mechanism, the operating handle 7 and the handle sleeve 3 can be locked in the desired angular position.

Figure 13:
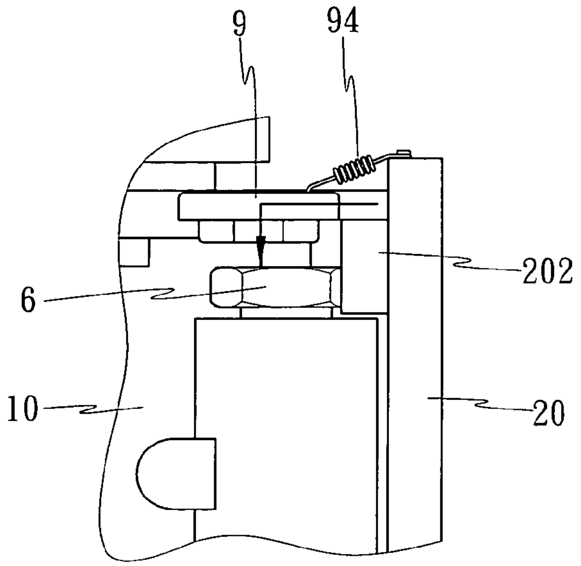
FIG. 13 is a schematic drawing of a part of the present invention, showing the pedal disengaged away from the safety block.
Figure 14:
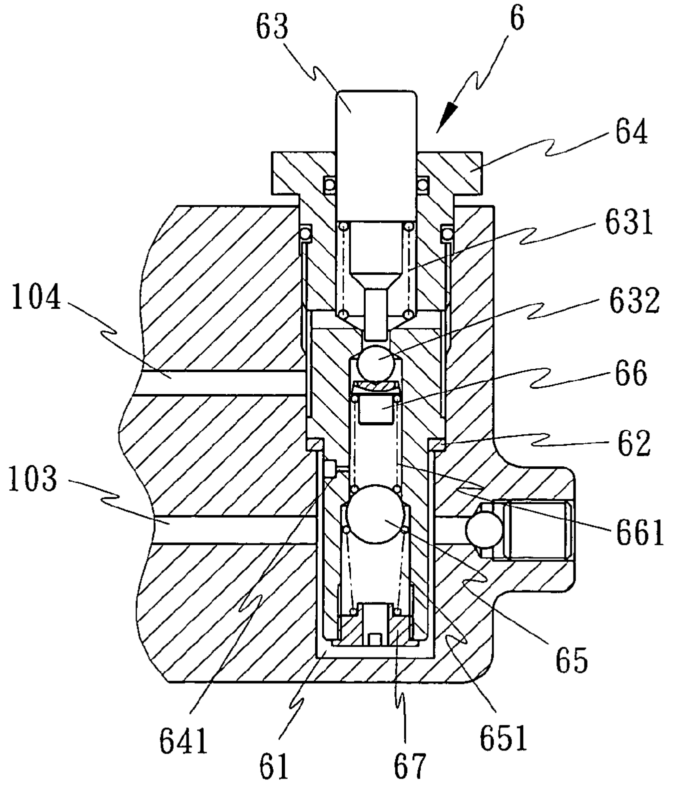
FIG. 14 is a sectional assembly view of the release valve of the hydraulic garage jack according to the present invention.
Figure 15:
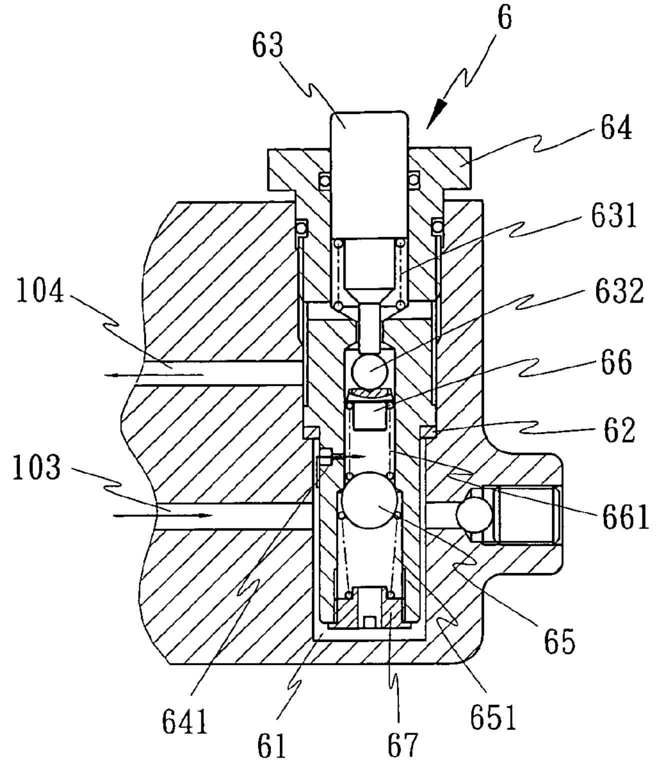
FIG. 15 is a schematic sectional view of a part of the present invention, showing the return stroke of the hydraulic fluid through the release valve under the load.
Figure 16:
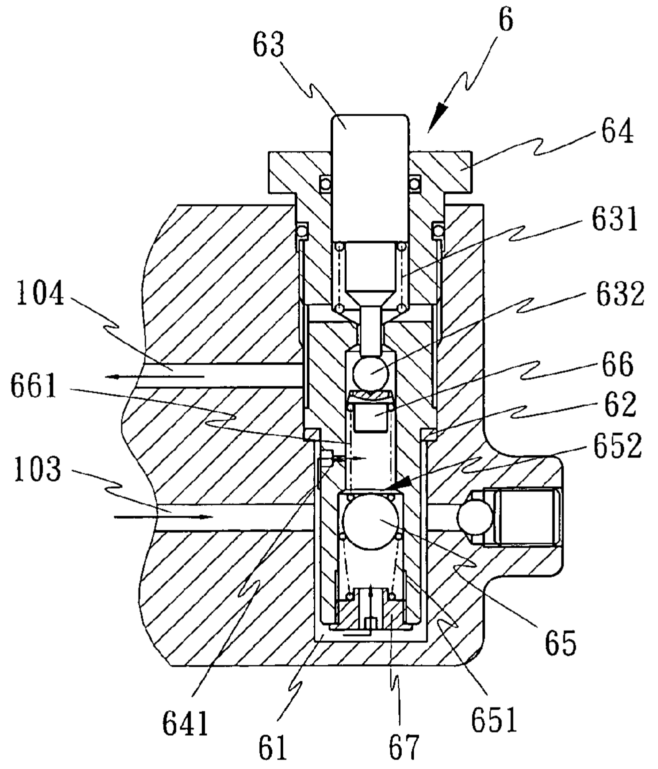
FIG. 16 is a schematic sectional view of a part of the present invention, showing the return stroke of the hydraulic fluid through the release valve free from the load.

Further, as stated above, the handle sleeve 3 and the release valve 6 are separately installed. A U-lug 91 is affixed to the hydraulic unit 10 with a screw bolt 93 at one side of the valve chamber 61, which receives the sleeve valve 6. A pedal 9 is pivotally connected to the U-lug 91 with a pivot 92. A tensile spring 94 is connected between the pedal 9 and one upright sidewall 20 of the swiveling holder 2 (see FIG. 5). A safety block 202 is provided at one upright sidewall 20 of the swiveling holder 2. The traction force 94 of the tensile spring 94 normally holds the pedal 9 on the top side of the safety block 202, i.e., the safety block 202 stops the pedal 9 from downward action, keeping the release valve 6 in the closed state. When wishing to return the hydraulic fluid, the pedal 9 is moved obliquely away from the safety block 202 (see the arrowhead direction in FIG. 13), and then pressed to lower the release valve connecting bar 63, allowing return of the hydraulic fluid. When the user releases the pedal 9, the tensile spring 94 immediately pulls the pedal 9 back to its former position above the safety block 202, and a first steel ball 632 that is provided at the bottom side of the release valve connecting bar 63 is returned to the normal-close position. The release valve 6 is mounted with a copper washer 62 in the valve chamber 61. Further, the release valve 6 is comprised of the aforesaid release valve connecting bar 63, a return oil guide chamber 64, the aforesaid first steel ball 632, a second steel ball 65, a steel ball stopper 66, a barrel-like compression spring 661, a conical compression spring 651, and an adjustment screw 67 (see FIG. 14). The return oil guide chamber 64 has a small return oil hole 641. When the hydraulic garage jack is bearing the load, the second steel ball 65 is not openable, and the return flow of the hydraulic fluid can only go through the small return oil hole 641 to the accumulation fluid chamber (not shown) through a hydraulic fluid passage 104 (see FIG. 15) to have the lifting arm 30 be lowered slowly, ensuring high safety. When the hydraulic garage jack bears no pressure during the hydraulic return stroke, the second steel ball 65 is opened due to a pressure difference between two opposite sides (see FIG. 16), thereby opening a bit return oil hole 65. At this time, the return flow of the hydraulic fluid goes through the second steel ball 65 rapidly, thereby lowering the lifting arm 30 rapidly. Further, the hydraulic fluid passage 103 is connected to the cylinder, and the hydraulic fluid passage 104 is connected to the accumulation fluid chamber.

Figure 17:
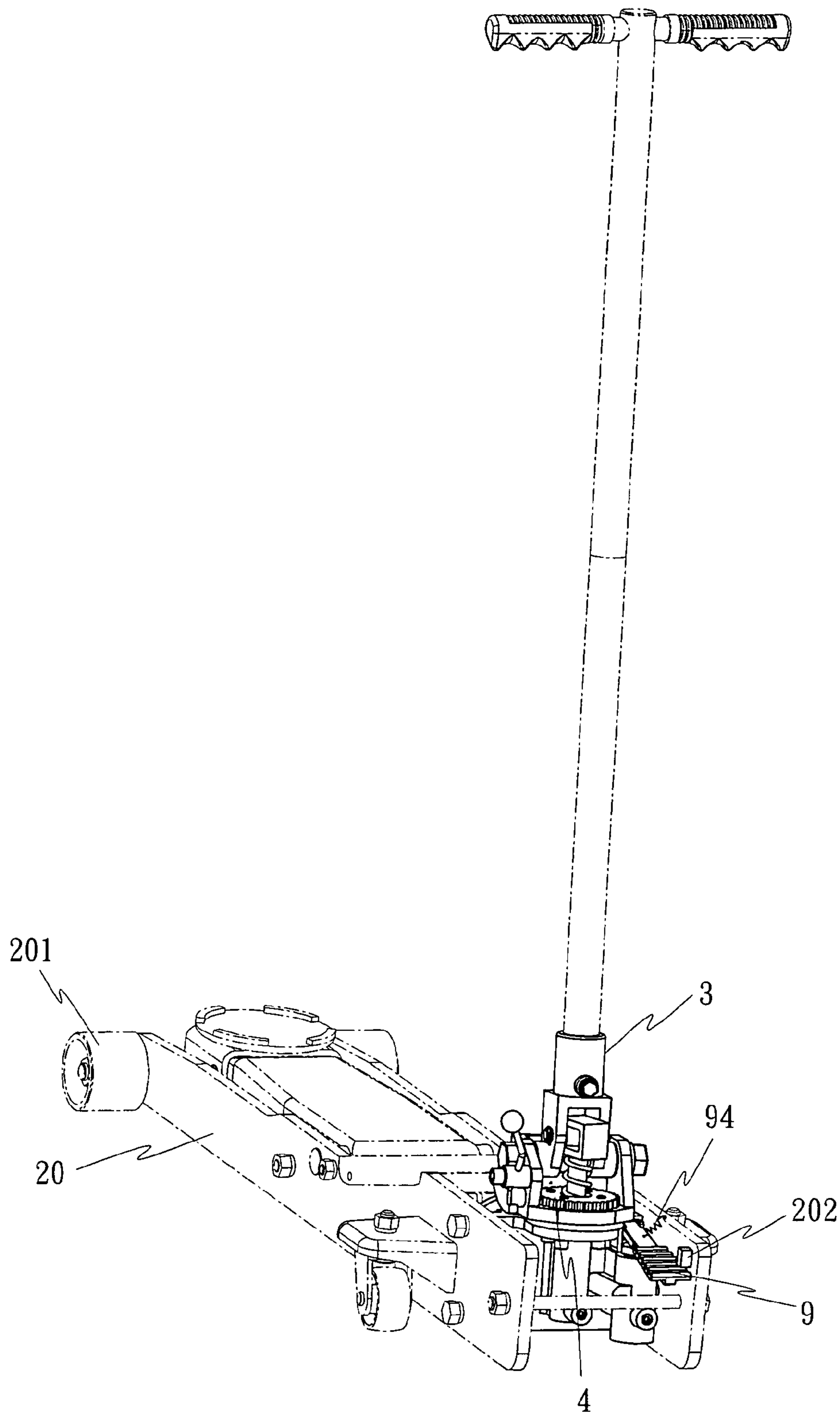
FIG. 17 is a schematic drawing of a part of the present invention, showing the pedal installed on the bottom side of the safety block.

The arrangement of the aforesaid safety block 202 is to prevent accidental action of the pedal 9 in lowering the lifting arm 30 when the hydraulic garage jack is bearing the load. In the operation status shown in FIG. 17, the pedal 9 is stopped at the bottom side of the safety block 202. When the hydraulic garage jack is to be moved to a location beneath the chassis of a car, the pedal 9 is operated to push the release valve connecting bar 63 and to further open the first steel ball 632. At this time, operating the operating handle 7 does not lift the lifting arm 30, and therefore the lifting arm 30 does not hinder the user from moving the hydraulic garage jack to the space beneath the chassis of the car.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A swiveling handle mounting mechanism mounted on a pump of a hydraulic unit of a hydraulic garage jack, comprising:

a valve chamber defined in said pump and accommodating a release valve, said release valve defining a fluid chamber;

a seat affixed to said pump, said seat having a center hole disposed in fluid communication with the fluid chamber of said pump;

a swiveling holder, said swiveling holder having two upright sidewalls arranged at two sides, and a vertically extending circular bottom hole coupled to said seat to allow swiveling of said swiveling holder on said seat;

a handle sleeve pivotally coupled between the two upright sidewalls of said swiveling holder and holding an operating handle;

a pressure plate affixed to said seat, said pressure plate having a center hole aimed at the center hole of said seat;

a plunger inserted into the fluid chamber of said pump and pivotally coupled to said handle sleeve for moving by said handle sleeve to pump a hydraulic fluid out of the fluid chamber of said pump when the operating handle that is connected to said handle sleeve is operated;

a return spring sleeved onto said plunger and stopped between said pressure plate and one end of said plunger outside said pump; and a locking mechanism installed in one upright sidewall of said swiveling holder for locking said handle sleeve, said locking mechanism comprising a ratchet fixedly arranged around the periphery of said pressure plate, a pinhole on one upright sidewall of said swiveling holder, and a lock pin inserted through said pinhole on the associated sidewall of said swiveling holder and movable relative to said swiveling holder between a locking position where said lock pin engages said ratchet to lock said handle sleeve to said swiveling holder and an unlocking position where said lock pin is disengaged from said ratchet for allowing movement of said handle sleeve relative to said swiveling holder, a spring member mounted on said lock pin and stopped between a part of said swiveling holder and one end of said lock pin to hold said lock pin in said unlocking position, and an actuating member pivoted to the upright sidewall of said swiveling holder holding said lock pin for moving said lock pin between said locking position and said unlocking position, said actuating member having a finger rod extended from one end thereof for operation by hand.

2. The swiveling handle mounting mechanism as claimed in claim 1, further comprising a pedal assembly pivoted to one side of said valve chamber for operation to move open said release valve.

3. The swiveling handle mounting mechanism as claimed in claim 2, wherein said pedal assembly comprises a U-lug affixed to said hydraulic unit with a screw bolt at one side of said valve chamber, a pedal pivotally connected to the U-lug with a pivot, and a tensile spring connected between said pedal and one upright sidewall of said swiveling holder.

4. The swiveling handle mounting mechanism as claimed in claim 3, further comprising a safety block fixedly provided at one upright sidewall of said swiveling holder for supporting said pedal and stopping said pedal from operation.

5. The swiveling handle mounting mechanism as claimed in claim 1, wherein said seat and said pressure plate are affixed to a top wall of said pump with screw bolts.

6. The swiveling handle mounting mechanism as claimed in claim 1, wherein said seat is a short, stepped cylindrical member having a plurality of mounting through holes fastened to a top wall of said pump with screw bolts and spring washers.

7. The swiveling handle mounting mechanism as claimed in claim 1, wherein said seat has an upper small diameter part inserted into the vertically extending circular bottom hole of said swiveling holder; said swiveling holder has two screw holes respectively transversely formed on the two upright sidewalls of said swiveling holder; said handle sleeve is pivotally connected to the screw holes of said swiveling holder between the two upright sidewalls of said swiveling holder with a respective pivot bolt and a respective washer.

8. The swiveling handle mounting mechanism as claimed in claim 1, wherein said swiveling holder has a connecting wall transversely connected between the two upright sidewalls of said swiveling holder.

9. A swiveling handle mounting mechanism mounted on a pump of a hydraulic unit of a hydraulic garage jack, comprising:

a valve chamber defined in said pump and accommodating a release valve, said release valve defining a fluid chamber;

a seat affixed to said pump, said seat having a center hole disposed in fluid communication with the fluid chamber of said pump;

a swiveling holder, said swiveling holder having two upright sidewalls arranged at two sides, and a vertically extending circular bottom hole coupled to said seat to allow swiveling of said swiveling holder on said seat;

a handle sleeve pivotally coupled between the two upright sidewalls of said swiveling holder and holding an operating handle;

a pressure plate affixed to said seat, said pressure plate having a center hole aimed at the center hole of said seat;

a plunger inserted into the fluid chamber of said pump and pivotally coupled to said handle sleeve for moving by said handle sleeve to pump a hydraulic fluid out of the fluid chamber of said pump when the operating handle that is connected to said handle sleeve is operated; and a return spring sleeved onto said plunger and stopped between said pressure plate and one end of said plunger outside said pump;

wherein said release valve is mounted with a copper washer in said valve chamber, and comprised of a release valve chamber, and comprised of a release valve connecting bar, a return oil guide chamber, a first steel ball, a second steel ball, a steel ball stopper, a first compression spring, a conical compression spring, and an adjustment screw, said return oil guide chamber having a small return oil hole.

* * * * *